(12) United States Patent
Swallow

(10) Patent No.: US 9,558,640 B2
(45) Date of Patent: Jan. 31, 2017

(54) CAMERA HIDDEN IN ID CARD HOLDER

(71) Applicant: Connexion2 Limited, Sheffield (GB)

(72) Inventor: Craig Swallow, Sheffield (GB)

(73) Assignee: Connexion2 Limited, Sheffield, South Yorkshire (GB)

( * ) Notice: Subject to any disclaimer, the term of this patent is extended or adjusted under 35 U.S.C. 154(b) by 260 days.

(21) Appl. No.: 14/400,772

(22) PCT Filed: May 13, 2013

(86) PCT No.: PCT/GB2013/051226
§ 371 (c)(1),
(2) Date: Nov. 12, 2014

(87) PCT Pub. No.: WO2013/167912
PCT Pub. Date: Nov. 14, 2013

(65) Prior Publication Data
US 2015/0124089 A1 May 7, 2015

(30) Foreign Application Priority Data

May 11, 2012 (GB) .................................. 1208310.1

(51) Int. Cl.
| G08B 13/00 | (2006.01) |
| G08B 13/196 | (2006.01) |
| G03B 17/02 | (2006.01) |
| G08B 15/00 | (2006.01) |
| B42D 25/00 | (2014.01) |
| B42D 25/324 | (2014.01) |

(52) U.S. Cl.
CPC ......... *G08B 13/19619* (2013.01); *B42D 25/00* (2014.10); *G03B 17/02* (2013.01); *G08B 13/19632* (2013.01); *G08B 15/001* (2013.01); *B42D 25/324* (2014.10); *B42D 2033/04* (2013.01); *B42D 2033/22* (2013.01); *B42D 2035/20* (2013.01)

(58) Field of Classification Search
CPC .... G08B 13/19619; B42D 25/00; G03B 17/02
USPC ....................................................... 348/143
See application file for complete search history.

(56) References Cited

U.S. PATENT DOCUMENTS

2013/0043144 A1* 2/2013 McDonald ............. A45C 11/00
206/38

* cited by examiner

Primary Examiner — Jeffery Williams
(74) Attorney, Agent, or Firm — NK Patent Law PLLC

(57) ABSTRACT

A surveillance system comprising an electronic identity card holder 100 and corresponding identity card 170. The card holder 100 comprises a slot 150 for receiving an identity card 170. The slot 150 has a first side 150a and an opposing second side 150b. The first side 150a of the slot 150b comprising a viewing window 140 positioned to allow viewing of the second side 150b of slot 150. The card holder 100 also has a camera housed within the holder 100, and the camera has a camera aperture 196 provided on the second side 150b of the slot 150. The corresponding identity card 170 comprises an optically transparent region 175 that is configured to overlie the camera aperture 196 when the identity card 170 is received in the slot 150 of the holder 100.

19 Claims, 4 Drawing Sheets

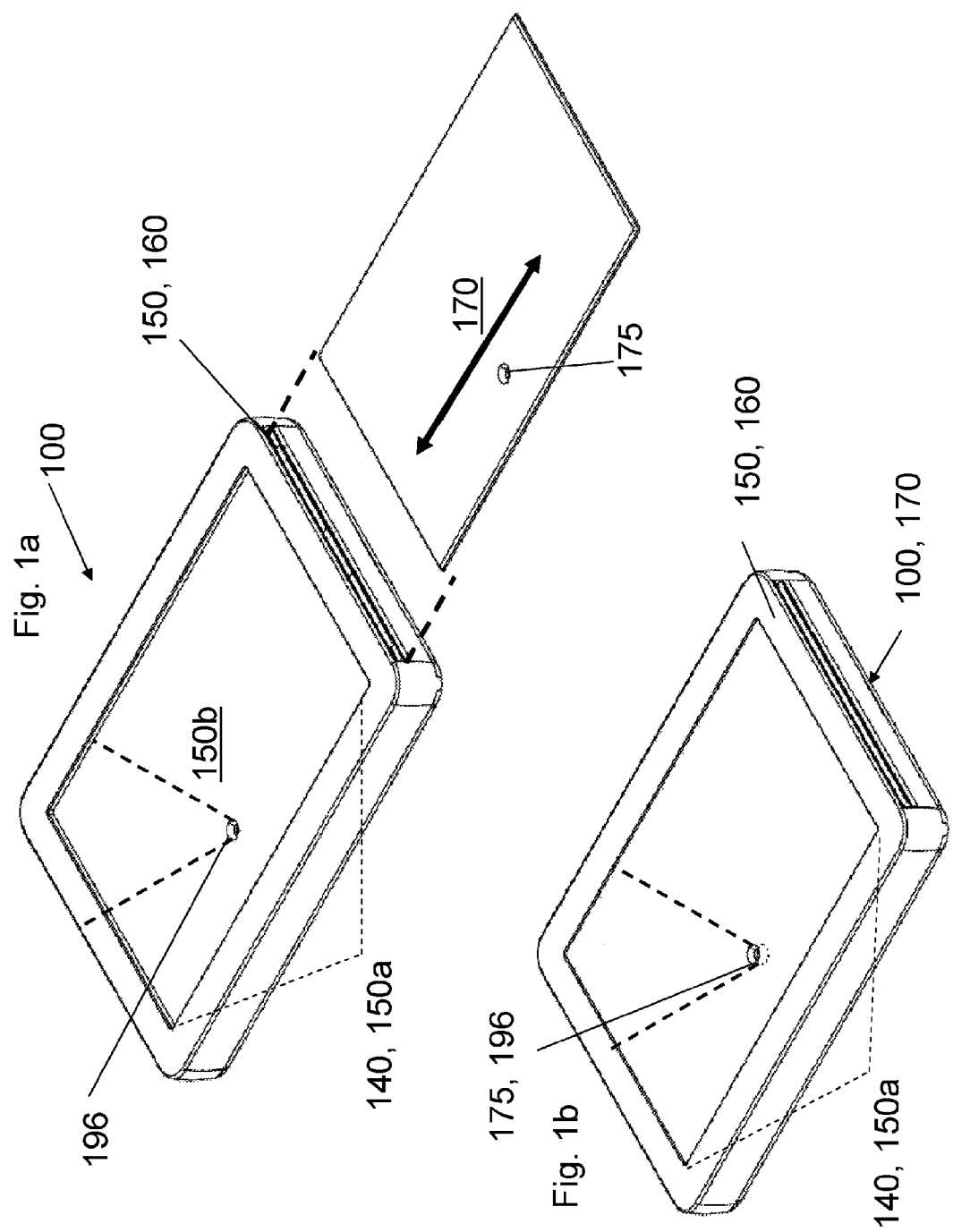

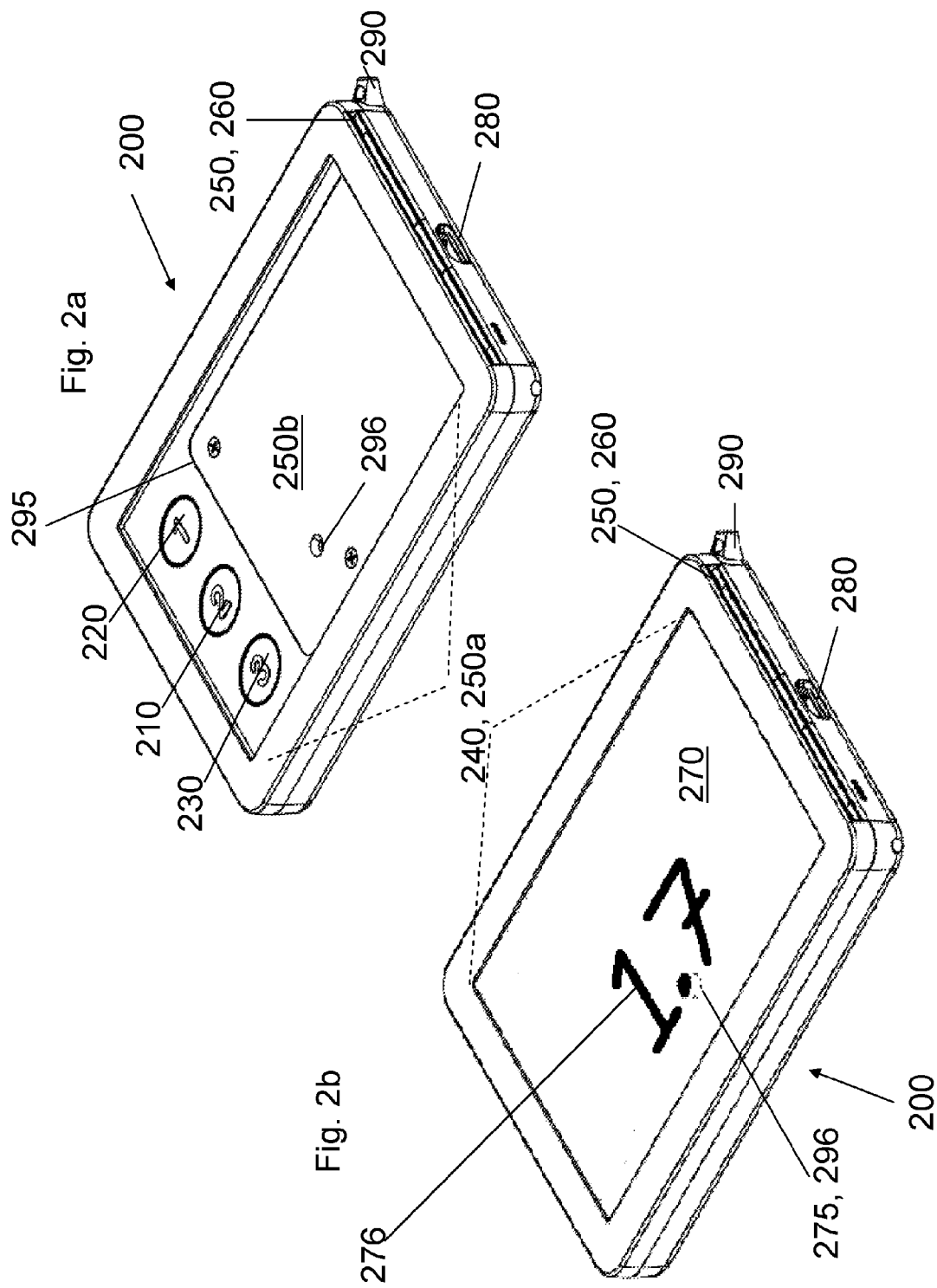

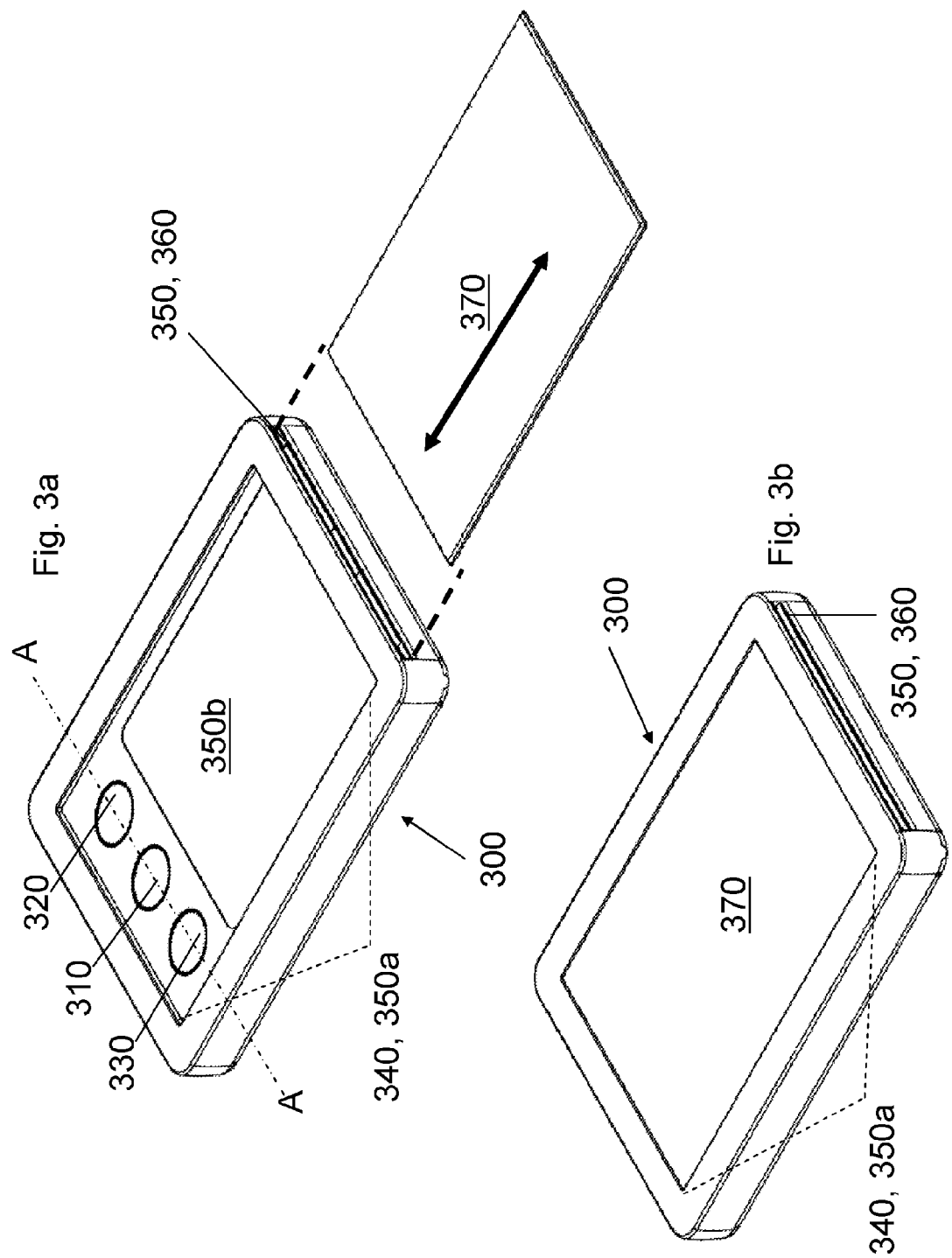

CAMERA HIDDEN IN ID CARD HOLDER

The technical field relates to personal surveillance systems.

BACKGROUND OF THE INVENTION

In environments such as hospitals, schools, construction sites, etc, the safety of personnel working on those sites is of great importance and it is beneficial to provide personnel with cameras that allow for monitoring of their environment and safety. Construction workers can be equipped with helmets that have cameras attached that get a 'first-person' view of what the construction worker sees. Cameras in such arrangements are generally bulky, expensive, and exposed to damage due to how they protrude from the helmet. Such solutions are also not suitable for hospital workers or school staff because such camera arrangements are too bulky or obtrusive for such workers.

Recent advances in camera technology allow more discreet cameras to be provided, e.g. as part of a lapel or pin-badge. However, these have comparatively poor performance, as they experience reduced battery life, poor resolution, transmission problems, and are easily knocked off a wearer/user due to their size. Such cameras are still not that discreet for use by such personnel.

SUMMARY OF THE INVENTION

In one aspect described herein, there is provided a surveillance system comprising an electronic identity card holder and corresponding identity card. The holder comprises a slot for receiving an identity card in the holder, the slot having a first side and an opposing second side. The first side of the slot comprises a viewing window positioned to allow viewing of the second side of slot. The holder also comprises a camera housed within the holder, the camera having a camera aperture provided on the second side of the slot. The corresponding identity card comprises an optically transparent region that is configured to overlie the camera aperture when the identity card is received in the slot of the holder.

Providing the camera aperture for viewing the surrounding environment in an area that would normally not allow for viewing renders the camera discreet. Because the camera is integrated with the card holder, this allows for use of better camera technology without worrying about the size of the camera rendering the camera itself more obvious. Also, for environments where personnel such as security staff might encounter violent incidents, behaviour of offenders can be candidly captured by the camera because the idea that such a card holder is viewing an environment through a card will not likely occur to such offenders.

Other aspects of the invention are recited in the claims and will be apparent from the description which follows.

FIGURES

FIGS. 1a and 1b show perspective views of a first embodiment of a surveillance system having a card holder and corresponding identity card.

FIGS. 2a and 2b show perspective views of a second embodiment of a surveillance system having a card holder and corresponding identity card.

FIGS. 3a and 3b show a perspective view of another embodiment of an electronic identity card holder with an identity card.

FIG. 3c shows a cross-section view of the embodiment of FIG. 3a, taken through A-A on FIG. 3a.

SPECIFIC DESCRIPTION

Figure 3C:
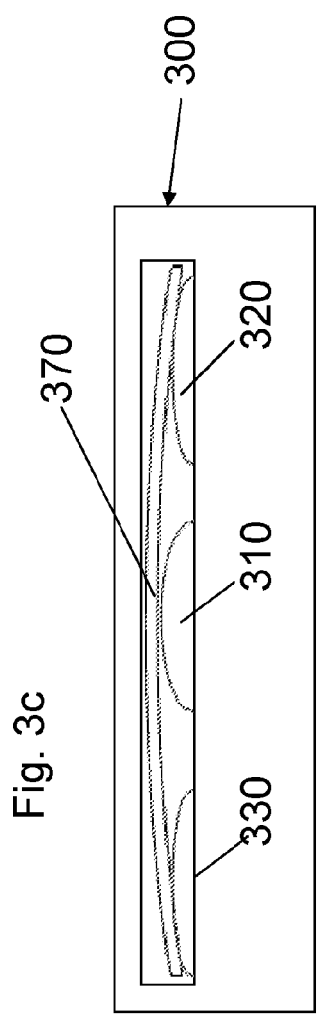

We will now describe a first embodiment of a surveillance system with reference to FIG. 1a which shows an electronic device that is an identity card holder 100.

A housing of the card holder 100 has a slot 150 for receiving an identity card 170. The housing is formed of a blend of polycarbonate and ABS, but it will be appreciated that other materials can also be used to form the housing. Identity card 170 is a standard identity card conforming to ISO standards (e.g. ISO/IEC 7810 ID1-85.6 mm×53.98 mm but thickness can vary, which can be on the order of 1-3 mm). The slot 150 is dimensioned to accept identity cards that conform to various ISO standards through slot opening 160. The slot 150 has a first side 150a and an opposing second side 150b. The first side 150a of the slot 150 has a viewing window 140 positioned to allow viewing of the second side 150b of the slot 150.

Housed internally (not shown) within the holder 100 is camera circuitry. The camera has an aperture 196 which is positioned on the second side of the slot 150b for surveillance and viewing of the external environment.

The identity card 170 has an optically transparent region 175 that is configured and positioned so that the optically transparent region 175 overlies the camera aperture 196 when the identity card 170 is received in the slot 150 of the holder 100. The optically transparent region 175 in this embodiment is a hole, but in other embodiments it could be a transparent material (e.g. perspex, or the like) or any arrangement that allows light to pass through a portion of the card 170 unimpeded.

FIG. 1b shows the card holder 100 when an identity card has been inserted into the slot. The optically transparent region 175 is now aligned with and overlies the camera aperture 196 so that the field of view of the camera (via the aperture 196) is unimpaired by the card 170 that would otherwise block the camera from viewing the surrounding environment.

The position of the aperture and transparent region relative to the card and card holder is not necessarily restricted to just one place, but could be anywhere on the second side of the slot that would permit viewing when the system of the holder 100 and the card 170 is assembled together. What matters is that the aperture 196 and optically transparent region 175 are overlayed when the card 170 is inserted into the slot 150 of the holder 100.

What is provided is a surveillance system which, when worn by a user, provides a discreet visual monitoring system. In certain situations, the knowledge that people are being watched by others causes people to behave differently than they otherwise would. By disguising the camera in this way, people around the user of the system can be observed without their knowledge that the combination of the card holder 100 and card 170 houses a camera, and so they will not change their behaviour. For surveillance or security purposes this is ideal for capturing true behaviour. For security or safety personnel this is helpful to ensure that accurate footage of any incidents can be captured.

The integration of the camera within the card holder 100 means that larger cameras/camera circuitry can be used without that affecting the discreetness of the surveillance system. This can allow for use of better camera technology than stand-alone miniaturised cameras, and the camera is still less obvious because of its integration within the holder 100.

FIGS. 2a and 2b show another embodiment of the holder and card. This embodiment is similar to that of FIGS. 1a and 1b except that the holder 200 has buttons 210-230 that provide for particular functions (other circuitry can be housed within the holder to provide for such functions).

In this example embodiment, the optically transparent region 275 is a transparent material configured to act as a lens to direct light into the camera aperture 296. The region 275 can also be configured appropriately to compensate for a particular angle of wearing of the card holder 200 and card 270 arrangement by the user.

In this example embodiment, the identity card 270 comprises a surface pattern 276 for provision in the viewing window when received in the slot of the holder (e.g. employee name/number, etc). The optically transparent region is arranged so as to be graphically integrated as a region of that surface pattern. In FIG. 2b it can be seen that the surface pattern 276 is a black silk-screened number '1.7'. The inside of the optically transparent region can also be coloured in black so as to blend into the surface pattern and serve as the decimal place on the card. That way, when a person looks at the card and card holder, they do not see a card with an obtrusive hole, but they see just a standard card holder and card.

The surface pattern 276 in this example embodiment is a two-dimensional graphical pattern, but it can be a three-dimensional relief pattern (e.g. embossed and/or raised portions) or both.

The embodiment of FIGS. 2a and 2b also has a micro-USB slot 280 that allows a user to connect another device to the card holder 200 to allow for initialisation and/or customisation. For example, the buttons 210-230 provide functions, which can be preset during manufacture, or can be user-configurable via the micro-USB slot (or even configurable via the card holder 200 in isolation).

FIG. 2a also shows an area 295 which the camera aperture 296 is provided. Other features or elements (e.g. temperature sensors, light meters, radiation sensors, etc) could be provided on the second side of the slot 250b in particular applications.

FIGS. 2a and 2b also shows a wearing tag 290 which allows a lanyard, wrist strap or arm band to be attached to the card holder for wearing by a user.

Other examples can look substantially the same the card holders as shown in FIGS. 1a-b and 2a-b. Other examples need not be bound to looking the same as those card holders depicted.

The card holder of any embodiment can obviously be manufactured and used separately from the card, and vice versa. For example, one user might wish to sell their card holder to another user. A card for the other user can be manufactured with a different surface pattern that still disguises the optically transparent region in the appropriate location to overlie the camera aperture. The card could be manufactured by taking a standard identity card and punching a hole in the card positioned so as to overlie a camera aperture when inserted into a particular card holder. What matters is that the card is manufactured to have an optically transparent region configured to overlie a camera aperture of a corresponding electronic identity card holder when the identity card is inserted into the holder.

We will now describe another example embodiment with reference to FIG. 3a which shows an electronic device that is an identity card holder 300.

A housing of the card holder 300 has a slot 350 for receiving an identity card 370. The housing is formed of a blend of polycarbonate and ABS, but it will be appreciated that other materials can also be used to form the housing. The slot is dimensioned to accept identity cards that conform to various ISO standards (e.g. ISO/IEC 7810 ID1-85.6 mm×53.98 mm but thickness can vary, which can be on the order of 1-3 mm) through slot opening 360. The slot 350 has a first side 350a and an opposing second side 350b. The first side 350a of the slot 350 has a viewing window 340 positioned to allow viewing of the an identity card 370 inserted into the slot. When the card 370 is not in the slot 350 the viewing window 340 allows viewing of the second side 350b of the slot 350.

The second side 350b of the slot 350 comprises a first button 310, a second button 320, and a third button 330. Housed internally (not shown) within the holder 300 is circuitry that is connected to the respective buttons 310-330. Each button 310-330 is configured to perform a function provided by that circuitry in response to user-actuation of a particular button 310-330.

FIG. 3b shows the card holder 300 when an identity card has been inserted into the slot. As can be seen from this figure, the buttons 310-330 are hidden by the card 370 when the card 370 is fully inserted in the slot. The buttons 310-330 are positioned on the second side 350b of the slot so as to be rendered inaccessible when the card 370 is in the slot. The buttons 310-330 are therefore covered by a card 370 in the slot. In this example the buttons 310-330 are rendered selectively accessible by the presence/absence of an identity card 370 in the slot. This can enable a user to prevent accidental activation of functions provided by their card holder, e.g. due to knocking against an object or button activation within their pocket. This also hides the buttons 310-330 from view so that people other than the user would not be aware that the electronic card holder 300 itself would provide any functions. In other examples the card 370 can be made to be flexible enough to allow a user to press the buttons 310-330 through the card 370. Other options can include the card 370 being opaque to fully hide the buttons 310-330, or the card being transparent to allow viewing of the buttons 310-330 through the card.

It will be appreciated that while three buttons 310-330 have been shown, in some embodiments only first button 310 could be provided (e.g. to provide a clock-in/clock-out functionality), or any number of buttons could be provided, depending on the functionality desired for the card holder.

In a slightly modified example, the buttons 310-330 are configured to protrude above the surface of the second side 350b of the slot so as to provide a friction fit for an identity card 370 received in the slot 350. This can, for example, be provided by a rubber surface integrally formed with or disposed on the button 310, e.g. an elastic polymer. This can be seen to aid in securing a card within the slot so that it is not dislodged unintentionally. Also, while clips in current card holders require a user to use both hands to disengage the clips and remove the card, this friction fit approach means no clips are necessary and single-handed removal of the card from the slot is possible. A user can clasp the holder with one hand, with the viewing window facing upwards from the palm of their hand, and the user can slidably disengage the card from the holder just using their thumb.

FIG. 3c shows another slightly modified example, where the first button 310 is configured to protrude above the surface of the second and third buttons 320 and 330. The difference between the protrusions of the first button 310 and second/third buttons 320, 330 thereby causes a flex in the identity card 370 within the slot to further secure said identity card in the slot.

In FIG. 3c, because the card holder 300 has three buttons and the second and third buttons 320, 330 are positioned on opposite sides of the first button 310, the identity card is caused to be flexed in a curved manner about the first button 310 to secure said identity card in the slot. It will be appreciated that if just two buttons were used, or if the arrangement of the buttons was different then the flexing need not be curved, but could result in the identity card being elastically distended to secure the card within the slot.

Figure 4:
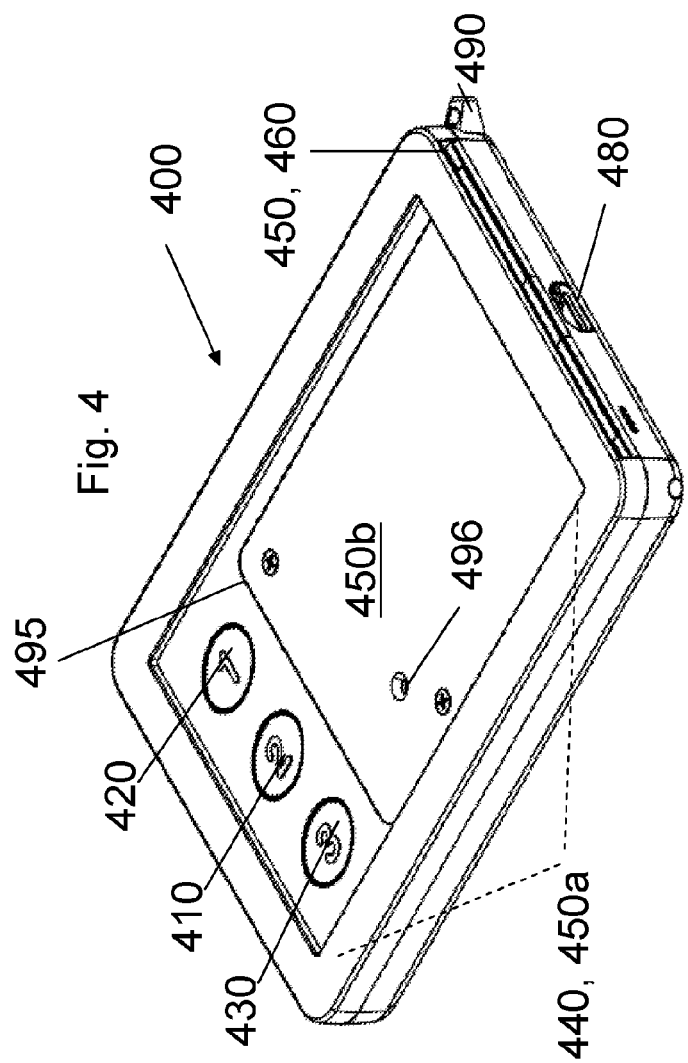
FIG. 4 shows a perspective view of another embodiment of an electronic identity card holder.

In FIG. 3c it is the height of the buttons themselves that control the friction fit. In another example, the first button 310 and the second/third buttons 320, 330 comprise first and second respective raised tactile profiles, e.g. due to embossed or overmolded patterns using materials like silicon rubber, and the patterns can be raised/formed into patterns like numbers/letters etc. The height of the raised tactile profiles can therefore control the extent of the protrusion of the respective buttons. FIG. 4 shows an example where the buttons have overmolded numbers '1', '2' and '3' that provide the heightened protrusions to provide said friction fit.

FIG. 4 also shows details of another embodiment that is similar to that of FIGS. 3a-3c except that there is also a micro-USB slot 480 that allows a user to connect another device to the card holder 400 to allow for initialisation and/or customisation. For example, the buttons 410-430 provide predetermined functions, which can be preset during manufacture, or can be user-configurable via the micro-USB slot (or even configurable via the card holder 400 in isolation).

FIG. 4 also shows an area 495 which has a camera aperture 496 provided. This can allow for images to be taken when the camera aperture 496 is unobscured. Other features or elements (e.g. temperature sensors, light meters, radiation sensors, etc) could be provided on the second side of the slot 450b so that they are selectively accessible in a similar fashion to the buttons 410-430 depending on whether a card is in the slot or not.

What can also be seen from FIGS. 3a and 4, is that the buttons are positioned proximal to the closed end away from the opening 360/460 to allow for access to said button(s) upon partial removal of the identity card from the slot. Just moving the card a short distance out of the slot reveals the buttons for use. This can be advantageous for quick user-access to the buttons without fully removing the card. Other buttons could be provided further along the second side of the slot so that certain functions are revealed depending on the extent to which the card is inserted/removed from the slot.

FIG. 4 also shows a wearing tag 490 which allows a lanyard, wrist strap or arm band to be attached to the card holder for wearing by a user.

The skilled person would realize that the raised tactile profile may be applied only to the first button 110, for example when there exists only one button, or when there exists more than one button. Equally, the raised tactile profile may be applied to any one or more buttons in any configuration.

It will be appreciated that this is similar to the embodiment shown in FIGS. 2a and 2b and features from each embodiment can be combined. It will also be appreciated that various features from some embodiments described above can be combined with other embodiments without departing from the scope of the present disclosure.

The invention claimed is:

1. A surveillance system comprising an electronic identity card holder and corresponding identity card, the holder comprising:
a slot for receiving an identity card in the holder, the slot having a first side and an opposing second side, the first side of the slot comprising a viewing window positioned to allow viewing of the second side of slot; and
a camera housed within the holder, the camera having a camera aperture provided on the second side of the slot,
wherein the corresponding identity card comprises an optically transparent region that is configured to overlie the camera aperture when the identity card is received in the slot of the holder.

2. The system of claim 1, wherein the optically transparent region is one of:
a hole, or a transparent material.

3. The system of claim 1, wherein the optically transparent region is configured to act as a lens to direct light into the camera aperture.

4. The system of claim 1, wherein the identity card comprises a surface pattern for provision in the viewing window when received in the slot of the holder, wherein the optically transparent region is graphically integrated as a region of that surface pattern.

5. The system of claim 4, wherein the surface pattern is one or more of a:
two-dimensional graphical pattern, and three-dimensional relief pattern.

6. The system of claim 1, wherein the card holder is configured to be wearable.

7. The system of claim 1, wherein the dimensions of the slot are configured to accept an identity card conforming to one or more ISO standards.

8. An electronic identity card holder for a surveillance system, the holder comprising:
a slot for receiving an identity card in the holder, the slot having a first side and an opposing second side, the first side of the slot comprising a viewing window positioned to allow viewing of the second side of slot; and
a camera housed within the holder, the camera having a camera aperture provided on the second side of the slot.

9. An identity card for use in a surveillance system having an electronic identity card holder and corresponding identity card, the holder having a slot for receiving an identity card in the holder, the slot having a first side and an opposing second side, the first side of the slot comprising a viewing window positioned to allow viewing of the second side of slot and a camera housed within the holder, the camera having a camera aperture provided on the second side of the slot, the identity card comprising an optically transparent region that is configured to overlie the camera aperture when the identity card is received in the slot of the holder.

10. A method of manufacturing an identity card for use with the card holder for a surveillance system, the holder being of the type having a slot for receiving an identity card in the holder, the slot having a first side and an opposing second side, the first side of the slot comprising a viewing window positioned to allow viewing of the second side of slot and a camera housed within the holder, the camera having a camera aperture provided on the second side of the slot, the method comprising:
providing an identity card having an optically transparent region that is configured to overlie the camera aperture when the identity card is received in the slot of the holder.

11. The system of claim 2, wherein the identity card comprises a surface pattern for provision in the viewing window when received in the slot of the holder, wherein the optically transparent region is graphically integrated as a region of that surface pattern.

12. The system of claim 3, wherein the identity card comprises a surface pattern for provision in the viewing window when received in the slot of the holder, wherein the optically transparent region is graphically integrated as a region of that surface pattern.

13. The system of claim 2, wherein the card holder is configured to be wearable.

14. The system of claim 3, wherein the card holder is configured to be wearable.

15. The system of claim 4, wherein the card holder is configured to be wearable.

16. The system of claim 5, wherein the card holder is configured to be wearable.

17. The system of claim 2, wherein the dimensions of the slot are configured to accept an identity card conforming to one or more ISO standards.

18. The system of claim 3, wherein the dimensions of the slot are configured to accept an identity card conforming to one or more ISO standards.

19. The system of claim 4, wherein the dimensions of the slot are configured to accept an identity card conforming to one or more ISO standards.

* * * * *